(12) United States Patent
Choi

(10) Patent No.: US 9,380,435 B2
(45) Date of Patent: Jun. 28, 2016

(54) COMMUNICATION SYSTEM, PACKET NETWORK, SUPPLEMENTARY SERVICE CONTROLLER, AND METHOD FOR PROVIDING SUPPLEMENTARY SERVICES

(71) Applicant: SK TELECOM. CO., LTD., Seoul (KR)

(72) Inventor: Woo Yong Choi, Anyang-si (KR)

(73) Assignee: SK TELECOM CO., LTD, Seoul (KR)

( * ) Notice: Subject to any disclaimer, the term of this patent is extended or adjusted under 35 U.S.C. 154(b) by 159 days.

(21) Appl. No.: 13/782,648

(22) Filed: Mar. 1, 2013

(65) Prior Publication Data

US 2013/0194976 A1 Aug. 1, 2013

Related U.S. Application Data

(63) Continuation of application No. PCT/KR2011/005338, filed on Jul. 20, 2011.

(30) Foreign Application Priority Data

Sep. 3, 2010 (KR) .................. 10-2010-0086726
Sep. 14, 2010 (KR) .................. 10-2010-0089759

(51) Int. Cl.
| | |
|---|---|
| H04L 29/08 | (2006.01) |
| H04W 4/16 | (2009.01) |
| H04L 12/66 | (2006.01) |
| H04L 12/64 | (2006.01) |

(52) U.S. Cl.
CPC ............. *H04W 4/16* (2013.01); *H04L 12/6418* (2013.01); *H04L 12/66* (2013.01)

(58) Field of Classification Search
CPC ............ H04L 65/1016; H04L 65/1069; H04L 65/1006
See application file for complete search history.

(56) References Cited

U.S. PATENT DOCUMENTS

| | | | |
|---|---|---|---|
| 2008/0130624 A1 | 6/2008 | Hua et al. | |
| 2009/0029697 A1* | 1/2009 | Bianconi et al. | ........... 455/432.3 |
| 2009/0268702 A1* | 10/2009 | Hua et al. | ....................... 370/338 |
| 2010/0103888 A1* | 4/2010 | Takano et al. | ................. 370/329 |

FOREIGN PATENT DOCUMENTS

| | | |
|---|---|---|
| EP | 2106088 | 9/2009 |
| KR | 1020080050298 | 6/2008 |
| KR | 100937067 B1 | 1/2010 |
| KR | 1020100037167 | 4/2010 |

OTHER PUBLICATIONS

International Search Report mailed Feb. 15, 2012 for PCT/KR2011/005338.
Korean Office Action for application No. 10-2010-0086726 dated Jul. 31, 2012.
Korean Notice of Allowance for application No. 10-2010-0086726 dated Dec. 14, 2012.

(Continued)

*Primary Examiner* — Gregory Sefcheck
*Assistant Examiner* — Jenkey Van
(74) *Attorney, Agent, or Firm* — Hauptman Ham, LLP

(57) ABSTRACT

The disclosure relates to providing supplementary services by interworking a packet network and a circuit network and sharing resources used to provide supplementary services therebetween.

12 Claims, 9 Drawing Sheets

(56) References Cited

OTHER PUBLICATIONS

Korean Office Action for application No. 10-2010-0089759 dated Sep. 5, 2012.

GSM, "3rd Generation Partnership Project; Technical Specification Group Services and Architecture; Study on enhancements to IMS Centralized Services (ICS)", Jun. 2009, 17 pages, V9.0.0.

* cited by examiner

| Supplementary service | User 1 | User 2 | User 3 | ... |
|---|---|---|---|---|
| ⋮ | ⋮ | ⋮ | ⋮ | ⋮ |
| Incoming call blocking | Active | Active | Inactive | ... |
| Line reopening notification | Active | Inactive | Inactive | ... |
| Coloring | Active | Active | Inactive | ... |
| Message call | Active | Inactive | Inactive | ... |
| ⋮ | ⋮ | ⋮ | ⋮ | ⋮ |

COMMUNICATION SYSTEM, PACKET NETWORK, SUPPLEMENTARY SERVICE CONTROLLER, AND METHOD FOR PROVIDING SUPPLEMENTARY SERVICES

CROSS-REFERENCE TO RELATED APPLICATION

The present application is a continuation of International Application No. PCT/KR2011/005338 which is based on, and claims priority from, KR Application Serial Numbers 10-2010-0086726 and 10-2010-0089759, filed on Sep. 3, 2010 and Sep. 14, 2010, respectively. The disclosures of the above-listed applications are hereby incorporated by reference herein in their entirety.

FIELD

The disclosure relates to providing supplementary services in a packet network while using resources of a circuit network.

BACKGROUND

IMS (IP Multimedia Subsystems) which has been developed for IP (Internet Protocol) multimedia services in the third-generation mobile communication network is now core technology for providing new services in All-IP based next-generation communication environments.

The IMS network which is a packet-switching based packet network may make it possible to provide mVoIP (mobile Voice over IP) as a packet based voice call service to users. However, the inventors have noted that, where All-IP environments have been not completely realized yet, new infrastructures are all constructed to provide supplementary services for a packet based voice call service, it may result in overlapping investments with existing similar infrastructures and also cause the burden of time and cost in constructing such infrastructures.

Additionally, where All-IP environments have been not realized yet, a circuit network providing circuit switching and a packet network providing packet switching may coexist with each other. In this case, a user terminal may use a voice call service by accessing either the circuit network or the packet network. Therefore, the inventors have noted that there is a need to control supplementary services for such a terminal across the circuit network and the packet network.

SUMMARY

In accordance with some embodiments, a packet network for providing supplementary services comprises a session controller and a supplementary service controller. The session controller is configured to establish a session connection associated with a basic service between terminals that access the packet network. The supplementary service controller is configured to check for a supplementary service providable to at least one of the terminals during the session connection, and to provide the providable supplementary service to the at least one of the terminals by interworking with a circuit network.

In accordance with some embodiments, a supplementary service controller for providing supplementary services comprises a communication module and a control module. The communication module is configured to transmit and receive data. The control module is configured to, when there is a session connection associated with a basic service between terminals that access a packet network, to check for a supplementary service providable to at least one of the terminals, and to provide the providable supplementary service to the at least one of the terminals through the communication module by interworking with a circuit network.

In accordance with some embodiments, a communication system for providing synchronized supplementary services comprises a plurality of terminals, a circuit network and a packet network. The circuit network includes a home location register that stores, for each of the plurality of terminals, a service profile having a list of supplementary services associated with the terminal. The circuit network is configured to provide at least one of the supplementary services to the terminal that accesses the circuit network according to state information associated with the supplementary service and indicating either activation or inactivation of the supplementary service. The packet network includes a supplementary service controller configured to share the service profile with the home location register, to synchronize the state information of the shared service profile through exchanging a message with the home location register, and to provide at least one of the supplementary services to the terminal that accesses the packet network depending on the synchronized state information. The terminal is configured to transmit to the packet network or the circuit network a message that requests a change of the state information with respect to at least one of the supplementary services.

In a method of providing supplementary services in accordance with some embodiments, a supplementary service controller of a packet network checks for a supplementary service providable to at least one of terminals when there is a request for a session connection between the terminals that access the packet network. The supplementary service controller interworks, if the supplementary service is providable by a supplementary service apparatus of a circuit network, with the supplementary service apparatus. The supplementary service controller provides the supplementary service to the at least one of the terminals accessing the packet network by using the supplementary service apparatus of the circuit network.

In a method of providing synchronized supplementary services, in accordance with some embodiments, at a supplementary service controller of a packet network, it is determined whether a received message is (i) a state change request message that requests a change of state information corresponding to a supplementary service of the supplementary service controller, or (ii) a synchronization message that requests a change of the state information to be the same as the state information of a home location register of a circuit network. The state information of the supplementary service controller is changed according to the state change request message if the received message is determined as the state change request message. A synchronization message is transmitted to the home location register to request the home location register to change the state information of the home location register to be the same as the changed state information.

DETAILED DESCRIPTION

The following description makes reference to the accompanying drawings in detail. However, one of ordinary skill in the art will understand the following description is not limited to the embodiments specifically disclosed below and is implemented in various forms and the scope of the following description is not limited to the following embodiments. Well known techniques, elements, structures, and processes will be omitted to avoid obscuring the subject matter of the disclosure.

Particular terms may be defined to describe the embodiments of this disclosure in the best manner. Accordingly, the meaning of specific terms or words used in this disclosure and the claims should not be limited to the literal or commonly employed sense, but should be construed in accordance with the subject matters of various embodiments as described herein. For example, "supplementary services" used herein refer to at least one of communication services other than a basic service for which a session connection is requested and/or established. Supplementary services are merely used to describe particular embodiments described herein, and are not intended to limit the scope of the embodiments as well as not limited to a literal or common meaning. Therefore, other alternative terms, for example "additional services," "extra services," "communication services" and so on, may be substituted for "supplementary services." The description of the various embodiments is to be construed as exemplary only and does not describe every possible instance. Therefore, it should be understood that various changes may be made and equivalents may be substituted for various elements.

Figure 1:
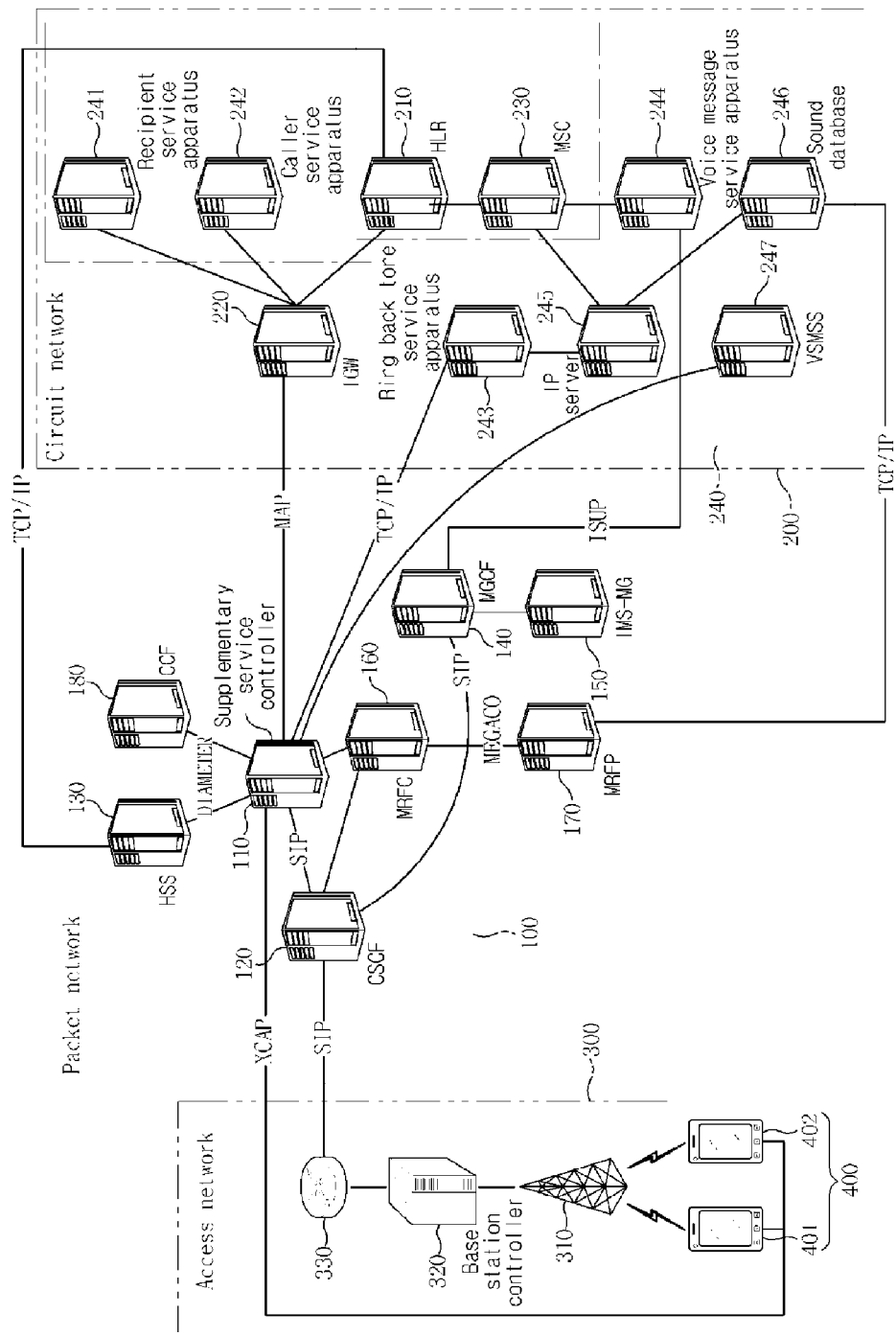
FIG. 1 is a schematic view of a communication system configured to provide supplementary services in accordance with at least one embodiment.

FIG. 1 is a schematic view of a communication system configured to provide supplementary services in accordance with at least one embodiment.

Referring to FIG. 1, the communication system according to at least one embodiment includes a packet network 100, a circuit network 200, an access network 300, and terminals 400.

The packet network 100 is a core network that provides communication services in accordance with a packet-switched method based on IP (Internet Protocol), and the circuit network 200 is a core network that provides communication services in accordance with a circuit-switched method.

The terminals 400 include a caller terminal (or an originating terminal) 401 which requests a call connection, and a recipient terminal (or a callee terminal or a terminating terminal) 402 which is a target of a call connection request.

The terminals 400 may access the packet network 100 through the access network 300, which connects the terminals 400 to the packet network 100. The packet network 100 may support all kinds of access networks 300. For example, the access network 300 may use a fixed access type such as DSL (Digital Subscriber Line), cable modem, or Ethernet. In this type, the access network 300 may provide a wired connection service such that the terminals 400 can access the packet network 100 through modem, router, or gateway, etc. wire-connected to the terminals 400. Alternatively, the access network 300 may use a mobile access such as W-CDMA, CDMA2000. GSM, or GPRS. In this type, the access network 300 including at least one of network entities such as a base station 310, a base station controller 320 and a gateway 330 provides a wireless service between the access network 300 and the terminals 400 such that the terminals 400 can access the packet network 100. Additionally, the access network 300 may use at least one of wireless accesses such as WLAN (Wireless Local Area Network), WiFi (Wireless Fidelity), or WiMAX (Worldwide Interoperability for Microwave Access). In this type, while having an access point, an access router and a gateway, the access network 300 provides a wireless service between the access network 300 and the terminals 400 such that the terminals 400 can access the packet network 100. Therefore, the terminal 400 capable of using the above-discussed access network 300 may access the packet network 100 through the access network 300. Meanwhile, as shown in FIG. 1, at least one embodiment uses the access network 300 including the base station 310, the base station controller 320 and the gateway 330. However, the access network 300 is not so limited, and any other type of access networks such as fixed access or wireless access may be alternatively used for the access network 300.

Particularly, in at least one embodiment, it is supposed that the packet network 100 is IMS (IP Multimedia Subsystem). The packet network 100 is composed of a number of entities, which may be formed of either a single integrated device or individually separate devices. Such entities of the packet network 100 includes a supplementary service controller 110, a session controller 120 also referred to as CSCF (Call Session Control Function), a home subscriber apparatus also referred to as an HSS (Home Subscriber Server) 130, a media gateway controller also referred to as an MGCF (Media Gateway Control Function) 140, a media gateway also referred to as an IMS-MG (IMS-Media Gateway) 150, a multimedia resource controller also referred to as an MRFC (Multimedia Resource Function Controller) 160, a multimedia resource processor also referred to as an MRFP (Multimedia Resource Function Processor) 170, and a charging processor also referred to as a CCF (Charging Collector Function) 180.

The supplementary service controller 110 is an entity for providing supplementary services to the terminals 400 in the packet network 100. The terminals 400 include a caller terminal which requests a call connection to a recipient terminal by originating a packet-based call or a circuit based call, and a recipient terminal which is a target end of the requested call connection. The supplementary service controller 110 may provide supplementary services by using its own supplementary service data or using supplementary service data of the packet network 100. Further, the supplementary service controller 110 may provide supplementary services by using supplementary service data of the circuit network 200 through interworking with the circuit network 200. In this disclosure, the term interworking refers to data exchange or communication between the packet network and the circuit network.

In order to provide supplementary services, the supplementary service controller 110 first checks whether to provide supplementary services to subscribers' terminals (i.e., either or both of a caller terminal and a recipient terminal). Here, subscribers include users of caller terminals and users of recipient terminals, who are registered to subscribe the supplementary services in either or both of HSS 130 or HLR 210. Subscribers' terminals include all the caller terminals and all the recipient terminals. To check whether to provide supplementary services, the supplementary service controller 110 may use a service profile of the HSS 130 in the packet network 100 or of an HLR 210 in the circuit network 200. The supplementary service controller 110 can check a service profile by looking up the service profile of either or both of the HSS 130 and the HLR 210 or after receiving and storing a service profile from the HSS 130 or from the HLR 210. A service profile has a list of services joined (or subscribed) by subscribers and/or their terminals, and each item of this list indicates a particular communication service. Here, each communication service may be a basic service (or standard service) or a supplementary service (or additional service). If a certain item is activated in the service profile, the supplementary service controller 110 may provide the service indicated by the activated item. If a certain item is not activated (inactivated) in the service profile, the supplementary service controller 110 may not provide the service indicated by the inactivated item.

After a caller terminal requests a call connection to a recipient terminal, the supplementary service controller 110 checks whether there is a supplementary service which is subscribed by a subscriber and available for a subscriber's terminal (i.e., either or both of the caller terminal and the recipient terminal). If any supplementary service is available for a subscriber's terminal, the supplementary service controller 110 provides the available supplementary service to the subscriber's terminal. Here, a subscriber includes a user of the caller terminal 401 and a user of the recipient terminal 402, and a subscriber's terminal includes the caller terminal 401 and the recipient terminal 402

If the caller terminal accesses the packet network 100 and tries to make a call, the supplementary service controller 110 may check whether there is a supplementary service which can be provided to the caller terminal 401. Additionally, if there is a request for a call connection from the caller terminal to the recipient terminal, the supplementary service controller 110 may check whether there is a supplementary service which can be provided to the recipient terminal 402. If the caller terminal 401 and the recipient terminal 402 are located (or camped on) at different packet networks 110, each supplementary service controller of such different packet networks 110 may exchange providable supplementary services with each other. For example, if a first supplementary service controller of one packet network on which the recipient terminal 402 is located can provide a specific supplementary service available for the caller terminal 401, a second supplementary service controller of another packet network in which the call terminal 401 is located may request the first supplementary service controller to provide the specific supplementary service available for the caller terminal 401.

If there is any providable supplementary service, the supplementary service controller 110 provides such a supplementary service to the caller terminal 401 or the recipient terminal 402, depending on the type of that supplementary service. The supplementary service controller 110 may provide supplementary services by using its own supplementary service data or using supplementary service data of the packet network 100. Further, the supplementary service controller 110 may provide supplementary services by using supplementary service data of the circuit network 200 while interworking with the circuit network 200. Here, supplementary service data may be various kinds of data required for supplementary services. For example, supplementary service data may be messages, sounds, videos, images, lists, or the like. Supplementary service apparatuses 240 are located in the circuit network 200 and provide supplementary services to subscribers' terminals that access the circuit network 200. The supplementary service apparatuses 240 store supplementary service data required for relevant supplementary services and can provide supplementary services by using such data. For example, the supplementary service apparatuses 240 include a recipient service apparatus 241, a caller service apparatus 242, a ring back tone service apparatus 243, and a voice message service apparatus 244.

The session controller 120, also referred to as the CSCF, establishes a session connection associated with a basic service (e.g., a voice call) between the terminals 400 via at least one entity of the packet network 100, and initiates and processes an SIP (Session Initiation Protocol) message received from the terminals 400. Also, in order to provide services at the request of the terminals 400, the session controller 120 completes the session by delivering the SIP message to each or at least one of entities 110~180 in the packet network 100. The session controller 120 may include (Interrogating)-CSCF, S(Service)-CSCF, and P(Proxy)-CSCF.

The home subscriber apparatus 130, also referred to as the HSS, stores subscriber information and is an evolved form of the HLR 210. Also, the home subscriber apparatus 130 supports entities that perform a session control. And also, the home subscriber apparatus 130 stores information about subscribers in connection with a session control, such as location information of subscribers, security information for authentication and approval of subscribers, and a service profile which includes a list of services joined by subscribers. In at least one embodiment, the list includes a plurality of services (e.g., basic and/or supplementary services) associated with the subscribers, and in such a list, services joined (subscribed) by the subscribers are indicated as activated items whereas services not joined by the subscribers are indicated as inactivated items.

The media gateway controller 140, also referred to as the MGCF, is configured to perform a signaling conversion between the packet network 100 and the circuit network 200. A signaling conversion means a conversion of data format (or message format, or protocol format) from protocols of messages used in the packet network 100 to ones used in the circuit network 200, and vice versa. For example, a conversion is performed from an SIP message to an ISUP (ISDN (Integrated Services Digital Network) User Part) message, and vice versa. For this, the media gateway controller 140 has a protocol conversion function for interworking with the circuit network 200. Also, the media gateway controller 140 has a function to control the media gateway 150.

The media gateway 150, also referred to as the IMS-MG, converts circuit traffic based on circuit-switched type into packet traffic of packet-switched type, and vice versa. For example, the media gateway 150 performs conversion between RTP (Real Time Protocol) traffic and PCM (Pulse Code Modulation) traffic. This may be made under the control of the media gateway controller 140. The media gateway 150 may be configured to be included in, to be integrated with, or to be separated from the media gateway controller 140.

The multimedia resource controller 160, also referred to as the MRFC, and the multimedia resource processor 170, also referred to as the MRFP, perform multimedia-related functions. Particularly, such multimedia-related functions include specific functions associated with the use of multimedia for providing supplementary services. For this, the multimedia resource controller 160 may control the multimedia resource processor 170. The multimedia resource controller 160 and the multimedia resource processor 170 may be formed of a single integrated device. For example, multimedia-related functions may include audible or visual announcement, audio stream mixing required for media conference, conversion between text and audio, voice recognition, real-time transcoding of multimedia data, and the like. If necessary for provision of supplementary services, the multimedia resource processor 170 may provide multimedia data to the terminals 400 under the control of multimedia resource controller 160.

The charging processor 180, also referred to as the CCF, collects charging data from the supplementary service controller 110 and creates a charging record using the collected charging data. For charging the respective terminals 400, the charging processor 180 may provide this charging record to a BS (Billing System). The charging record may be CDR (Call Detail Record).

The circuit network 200 in accordance with at least one embodiment will be hereinafter described. The circuit network 200 includes an HLR (Home Location Register) 210, a recipient service apparatus 241, a caller service apparatus 242, a ring back tone service apparatus 243, a voice message service apparatus 244, an IGW (Internetworking Gateway) 220, an MSC (Mobile Switching Center) 230, an IP server 245, a sound database 246, and a number portability message apparatus 247 also referred to as a VSMSS (Vertical SMS Server). In this disclosure, a supplementary service apparatus 240 will be used as a generic term for elements that support the provision of supplementary services, such as the recipient service apparatus 241, the caller service apparatus 242, the ring back tone service apparatus 243, the voice message service apparatus 244, the IP server 245, the sound database 246, and the number portability message apparatus 247.

The HLR 210 basically manages subscribers (or subscribers' terminals) in the circuit network 200. Namely, the HLR 210 may perform specific functions such as subscriber authentication, location registration, or the like. Particularly, the HLR 210 may manage basic services and supplementary services, which are joined by subscribers (or subscribers' terminals). A voice call and a video call are examples of basic services, whereas an incoming call switching and a voice message are examples of supplementary services. In order to manage services joined by subscribers (or subscribers' terminals), the HLR 210 may store a service profile which is a list of such services which are joined or subscribed by subscribers (or subscribers' terminals). Each item of this list indicates a particular service. If a certain item is activated, it indicates that a corresponding service to the certain item on the list is providable or available for subscribers (or subscribers' terminals). However, if a certain item is not activated, it indicates that a corresponding service is not providable or available for subscribers (or subscribers' terminals). This is equally applied to both basic services and supplementary services.

The recipient service apparatus 241 provides supplementary services to recipient terminals. For example, the recipient service apparatus 241 may provide supplementary services such as a missed call number presentation, an incoming call blocking, and the like. The recipient service apparatus 241 includes database that stores supplementary service data required for providing supplementary services, and has a web function for modifying contents of such supplementary services. For example, it is possible to store, update, change, delete, and search supplementary service data in the recipient service apparatus 241 through web.

A missed call number presentation service is a specific service to provide a caller number of missed call to an intended recipient in conditions where a call is not answered. Such conditions may be occurred on a power-off state of the recipient terminal 402, on a state where the line is busy, on a state where the line is dead, or the like. In this service, if there is an incoming call from the caller terminal 401 in conditions where the recipient terminal 402 fails to answer the incoming call, the supplementary service controller 110 provides a phone number of the caller terminal 401 to the recipient service apparatus 241. Additionally, the supplementary service controller 110 may request the recipient service apparatus 241 to provide the caller's number in the form of message to the recipient terminal 402. Thus, the recipient service apparatus 241 may provide the terminal number of the caller terminal 401 to the recipient terminal 402.

An incoming call blocking service is a specific service to restrict a call connection from selected callers to a specific recipient. In this service, a recipient may register selected callers in a call blocking list to reject incoming calls from selected callers. If one of registered callers tries to connect a call to an intended recipient, this service may prevent a recipient terminal from ringing and provide a guide message indicating a call failure to the caller. In this service, the recipient service apparatus 241 may store a call blocking list that records one or more of the caller terminals 401 selected by the recipient terminal 402. Namely, such a call blocking list is created through registration in the recipient service apparatus 241 by the recipient terminal 402. The supplementary service controller 110 may inquire of the recipient service apparatus 241 about whether the caller terminal 401 is registered in the call blocking list. If the caller terminal 401 is registered in the call blocking list, the supplementary service controller 110 may restrict a call connection of the caller terminal 401. Also, the recipient service apparatus 241 may provide a guide message indicating a call failure to the supplementary service controller 110. Then, the supplementary service controller 110 may deliver this message to the caller terminal 401.

The caller service apparatus 242 provides caller-oriented supplementary services and may be formed through MSIN (Mobile Station Identification Number) equipment.

The caller service apparatus 242 may provide supplementary services such as a line reopening notification service, or the like. A line reopening notification service is a specific service to notify a caller that an intended recipient who has been on the phone enters a state of allowing a call connection. This service not only notifies a caller in a message that an intended recipient is in a call-receivable state, but also automatically notifies a recipient of a call message from a caller. This service is available when the recipient terminal 402 with which the caller terminal 401 is trying to connect a call is busy. In this case, when a current call of the recipient terminal is finished, the supplementary service controller 110 may request the caller service apparatus 242 to inform the caller terminal 401 that the recipient terminal 402 enters a call-receivable state. Also, when a call connection fails because an intended recipient is on the phone, this service provides a guide message associated with service provision to the caller terminal 401. An example of such a guide message is as follows. "The line is busy. Message will follow when a call is available." Additionally, when the recipient terminal 402 which has been busy enters a call-receivable state, this service may provide a guide message to both the caller terminal 401 and the recipient terminal 402, as follows. "[Line Reopening Notification] A call is available at 011-123-4567." Also, this service may provide a guide message to the recipient terminal 402, as follows. "[Please Call] MM/DD/00:00 011-123-4567 Press call button for automatic dialing." And also, this service may automatically send a call message of the caller terminal 401 to the recipient terminal 402.

The ring back tone service apparatus 243 provides supplementary services associated with a ring back tone. The ring back tone service apparatus 243 may provide a multimedia file as a ring back tone, instead of a ring back tone sound of normal tone mode. Thus, the ring back tone service apparatus 243 stores multimedia files for a ring back tone, and such multimedia files include sounds, videos, and images. Hereinafter, a ring back tone based on multimedia files will be referred to as "a multimedia ring back tone." The ring back tone service apparatus 243 may provide a stored multimedia ring back tone at the request of the supplementary service controller 110. Also, the ring back tone service apparatus 243 may provide different multimedia ring back tones by subscribers (or subscribers' terminals) and by days of the week in response to the request of the supplementary service controller 110.

The voice message service apparatus 244 provides supplementary services associated with a voice message. The voice message service apparatus 244 receives and stores a voice message transmitted from the caller terminal 401 through the supplementary service controller 110 and may transmit the stored voice message to the recipient terminal 402. The voice message service apparatus 244 may be formed by means of equipment such as VPS (Voice Push Server) and VPIP (VoIP and the Internet).

The IGW 220 is a gateway among the supplementary service controller 110, the HLR 210, the recipient service apparatus 241, and the call service apparatus 242. The IGW 220 connects the supplementary service controller 110 with the HLR 210, the recipient service apparatus 241, or the call service apparatus 242.

The MSC 230 performs a call processing and a service interworking processing for a subscriber (or subscriber's terminal) when the subscriber's terminal receives a certain service in the circuit network 200, and performs a call and service processing by downloading subscriber's service profile from the HLR 210. Here, a service profile includes a basic service and at least one supplementary service. Also, when the terminal 400 accesses the circuit network 200, the MSC 230 performs authentication by querying the terminal 400 to the HLR 210 and registers a subscriber of the authenticated terminal 400. Since the supplementary service controller 110 uses a service profile of the HLR 210, the MSC 230 can provide the same supplementary service to the terminals 400 accessing the circuit network 200 as in the packet network 100.

The IP server 245 performs a multimedia-related function. The IP server 245 may provide a multimedia file to the terminal 400 if it is required for a supplementary service. This is similar to roles of the multimedia resource controller 160 and the multimedia resource processor 170.

The sound database 246 is database that stores a variety of sounds. Using one or more of the stored sounds, the sound database 246 may provide a supplementary service to the terminals 400.

The number portability message apparatus 247, also referred to as the VSMSS, provides a short message service to any number-changed terminals 400.

Figure 2:
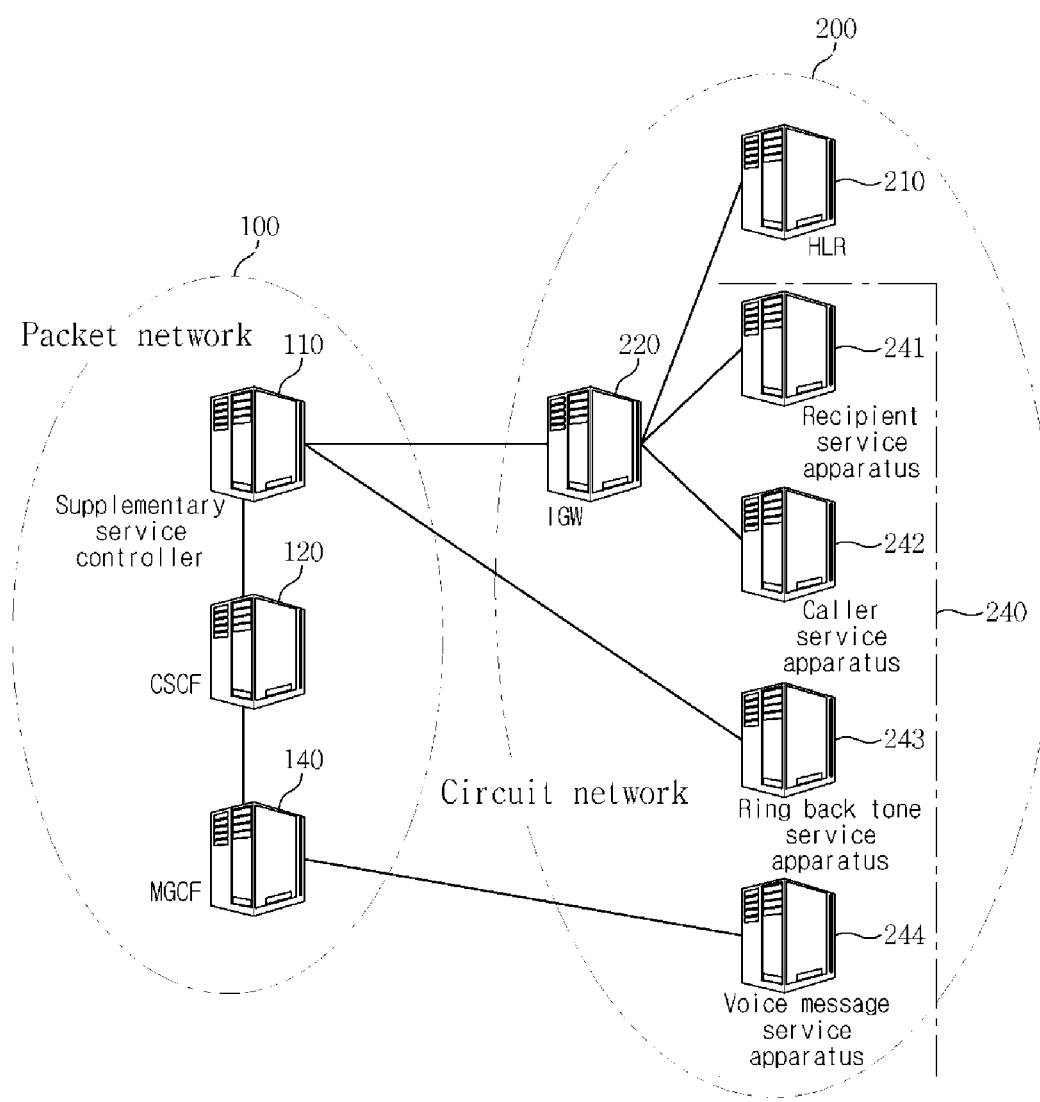
FIG. 2 is a schematic view of an interworking structure between a packet network and a circuit network configured to provide supplementary services in accordance with at least one embodiment.

FIG. 2 is a schematic view of an interworking structure between a packet network and a circuit network configured to provide supplementary services in accordance with at least one embodiment.

Referring to FIG. 2, the supplementary service controller 110 interworks and communicates with the HLR 210 according to MAP (Mobile Application Part).

The supplementary service controller 110 may query a service profile required for the HLR 210 or receive a required service profile through the IGW 220. The supplementary service controller 110 and the HLR 210 communicate in a protocol of MAP with each other through the IGW 220. If a service profile received from the HLR 210 is changed, the supplementary service controller 110 may deliver it to the HLR 210. Also, the HLR 210 may deliver a changed one of its own stored service profiles to the supplementary service controller 110. Therefore, the supplementary service controller 110 and the HLR 210 can keep and update the same service profile.

The supplementary service controller 110 interworks with the recipient service apparatus 241 or the caller service apparatus 242 through the IGW 220, and communicates with the recipient service apparatus 241 or the caller service apparatus 242 through the IGW 220 by using a protocol of MAP. The supplementary service controller 110 may query supplementary service data stored in database (DB) of the recipient service apparatus 241, receive supplementary service data in response to the queried, send a request message to request performing a supplementary service, and receive results corresponding the request.

The supplementary service controller 110 interworks and communicates with the ring back tone service apparatus 243 by using a protocol of TCP/IP (Transmission Control Protocol/Internet Protocol). The supplementary service controller 110 may query supplementary service data associated with ring back tone and stored in database (DB) of the ring back tone service apparatus 243, receive supplementary service data in response to the queried, send a request message to request performing a supplementary service, and receive results with respect to the request.

The supplementary service controller 110 may interwork with the voice message service apparatus 244 through the session controller 120 and the media gateway controller 140. To communicate with the voice message service apparatus 244, the supplementary service controller 110 may interwork with the session controller 120 and then communicate with the voice message service apparatus 244 through the media gateway controller 140. At this time, if the supplementary service controller 110 sends SIP data to the session controller 120, the session controller 120 delivers the received data to the media gateway controller 140. If the SIP data is a message, the media gateway controller 140 converts an SIP message into an ISUP message which is compatible to the circuit network 200, and delivers the converted ISUP message to the voice message service apparatus 244. On the contrary, in case where the voice message service apparatus 244 sends an ISUP message to the supplementary service controller 110, the media gateway controller 140 converts an ISUP message into an SIP message which is compatible to the packet network 100, and then delivers the converted SIP message to the session controller 120, which delivers the SIP message to the supplementary service controller 110. As discussed above, the supplementary service controller 110 may use SIP to transmit or receive data to or from the session controller 120.

The supplementary service controller 110 interworks with the HLR 210, the recipient service apparatus 241, the caller service apparatus 242, the ring back tone service apparatus 243, and the voice message service apparatus 244 located in the circuit network 200. The supplementary service controller 110 may provide supplementary services by using these supplementary service apparatuses 241~247 (for example, the recipient service apparatus 241, the caller service apparatus 242, the ring back tone service apparatus 243, and the voice message service apparatus 244). Namely, the supplementary service controller 110 can provide supplementary services by using supplementary service data, as it is, created in the circuit network 200 even for the terminals served from the circuit network 200. Also, each supplementary service apparatus may provide web environments to store, update, change and delete supplementary service data, and the web environments may be used as an interface for providing the supplementary services from each or all of the supplementary service apparatuses. Therefore, supplementary services provided in the circuit network 200 can be even adapted and used in the packet network 100, whereby the consistency in view of service quality for the supplementary services provided to the terminals can be maintained.

Figure 3:
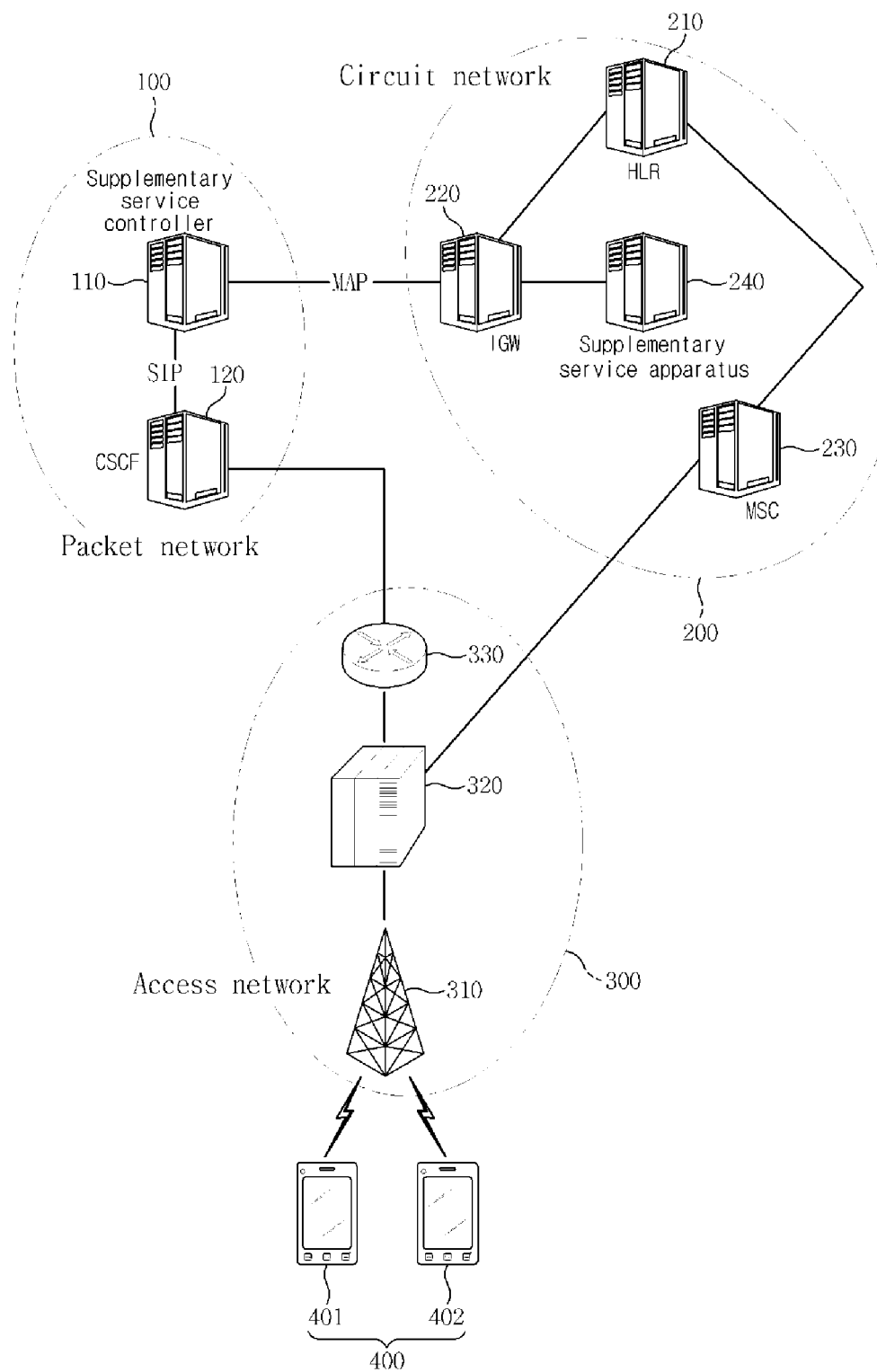
FIG. 3 is a schematic view of an interworking structure between a packet network and a circuit network configured to provide synchronized supplementary services in accordance with at least one embodiment.

FIG. 3 is a schematic view of an interworking structure between a packet network and a circuit network configured to provide synchronized supplementary services in accordance with at least one embodiment.

Referring to FIG. 3, as discussed above, the supplementary service controller 110 shares a service profile with the HLR 210 of the circuit network 200. For this, the supplementary service controller 110 may receive and store a service profile of the HLR 210. Also, if there occurs a change or an update in either of state information of each service profile held by the supplementary service controller 110 and the HLR 210, either of the supplementary service controller 110 and the HLR 210 transmits a synchronization message to the counterpart such that state information of a service profile is equally changed or updated (i.e., to be the same as) in the counterpart in order to maintain the same service profile. Thus, state information of a service profile is synchronized between the packet network 100 and the circuit network 200.

A synchronization message has supplementary service identification information specified for distinguishing each supplementary service. A synchronization message may be MAP message written in a format of MAP protocol. For example, a synchronization message may be AnyTimeModification message.

The following is an embodiment for describing a synchronization message in a format of MAP protocol.

Example 1

```
AnyTimeModificationArq ::= SEQUENCE {
subscriberIdentity [0] SubscriberIdentity,
gsmSCF-Address [1] ISDN-AddressString,
modificationRequestFor-CF-Info    [2] ModificationRequestFor-CF-Info
OPTIONAL,
modificationRequestFor-CB-Info    [3] ModificationRequestFor-CB-Info
OPTIONAL,
modificationRequestFor-CSI        [4] ModificationRequestFor-CSI
OPTIONAL,
extensionContainer [5] ExtensionContainer OPTIONAL,
longFTN-Supported [6] NULL OPTIONAL,
...,
modificationRequestFor-ODB-data [7] ModificationRequestFor-ODB-
data
OPTIONAL }
```

The above syntax defines a synchronization message, namely, AnyTimeModification message. This synchronization message is to request a change or update in settings of supplementary services. If one of the supplementary service controller 110 and the HLR 210 transmits a synchronization message, the other becomes aware of the need to change or update its own service profile.

Also, a synchronization message contains supplementary service identification information in order to inform a supplementary service to be changed or updated in a service profile. Here, supplementary service identification information may be inserted using the above-mentioned "extensionContainer".

The following is an embodiment for inserting supplementary service identification information in a synchronization message.

Example 2

```
SKTSupplemetaryServiceInfo ::= SEQUENCE {
SKTSS-ID SKTSSID,
ss-Status [1] Ext-SS-Status OPTIONAL,
forwardedToNumber [2] AddressString OPTIONAL,
extenstionContainer [3] ExtensionContainer OPTIONAL,
...
}
SKTSSID ::= OCTET STRING (SIZE(1..2))
-- OCTET 1:
SKT Supplemetary Service ID
ex) CNIP: 0x01
CNIP: 0x02
-- OCTET 2: Reserved
```

As shown above, a synchronization message describes supplementary service identification information for distinguishing any supplementary service from the others in "SKTSupplemetaryServiceInfo" of "extensionContainer".

According to the above, one of the supplementary service controller 110 and the HLR 210 receives a synchronization message as shown in <Example 1>, extracts supplementary service identification information from "SKTSupplemetaryServiceInfo" of "extensionContainer", and activates or inactivates state information of a supplementary service mapped with the extracted supplementary service identification information.

As discussed above, a synchronization message sends supplementary service identification information in order to change or update the state of a supplementary service. Thus, the supplementary service controller 110 or the HLR 210 receiving a synchronization message toggles the state of a supplementary service corresponding to supplementary service identification information. Namely, if the state of a supplementary service in a service profile is initially set as an active state and a synchronization message is received, the supplementary service controller 110 or the HLR 210 toggles from an active state to an inactive state based on supplementary service identification information of the received synchronization message. Similarly, if the state of a supplementary service in a service profile is initially set as an inactive state and a synchronization message is received, the supplementary service controller 110 or the HLR 210 toggles from an inactive state to an active state based on supplementary service identification information of the received synchronization message.

As discussed above, the supplementary service controller 110 and the HLR 210 synchronize their service profile through an exchange of a synchronization message. In some embodiment where the caller terminal 401 sends a request for a call connection to the recipient terminal 402, the supplementary service controller 110 determines whether the caller terminal 401 and/or the recipient terminal 402 are associated with one or more supplementary services and whether each of the one or more supplementary services is activated (or subscribed to). Then, if there is any providable supplementary service according to state information of each corresponding supplementary service, the supplementary service controller 110 determines to provide the corresponding supplementary service to the caller terminal 401 and/or the recipient terminal 402. By sharing a service profile and synchronizing state information in the service profile between the supplementary service controller 110 of the packet network 100 and the HLR 210 of the circuit network 200, the packet network 100 and the circuit network 200 can provide a synchronized supplementary service.

For a synchronization service with respect to a service profile, the session controller 120 in at least one embodiment may relay a message for requesting a change of a state (hereinafter referred to as a state change request message) and a message for responding to the requested message (hereinafter referred to as state change response message) written in a format of SIP protocol between the terminals 400 and the supplementary service controller 110. In this case, a state change request message may be INVITE message, and a state change response message may be 200 OK message.

Meanwhile, in at least one embodiment, the HLR 210 of the circuit network 200 interworks with the supplementary service controller 110 and they communicates with each other in a MAP (Mobile Application Part) protocol. The supplementary service controller 110 may receive and store a service profile obtained (or received) from the HLR 210 via the IGW 220. The HLR 210 may send and share its own service profile to and with the supplementary service controller 110. Additionally, if state information is changed in a service profile of one of the supplementary service controller 110 and the HLR 210, a synchronization message may be transmitted to the other such that the changed state information is equally changed or updated in a service profile of the other. Thus, state information of a service profile is synchronized between the supplementary service controller 110 and the HLR 210. In other words, the state information of a service profile with respect to one or more supplementary services is synchronized between the packet network 100 and the circuit network 200.

The supplementary service apparatus 240 comprehensively indicates all apparatuses equipped for a support of supplementary services in the circuit network 200, and may include the recipient service apparatus 241, the caller service apparatus 242, the ring back tone service apparatus 243, the voice message service apparatus 244, and the like as discussed above.

The supplementary service controller 110 may provide supplementary services by interworking with the supplementary service apparatus 240. Namely, the supplementary service controller 110 may query supplementary service data stored in database (DB) of the supplementary service apparatus 240, receive supplementary service data, send a request message to request performing a supplementary service, and receive results related to the performed supplementary service requested. As discussed above, the supplementary service controller 110 can provide supplementary services by using one or more supplementary service apparatus 240 located in the circuit network 200. Namely, the supplementary service controller 110 can provide supplementary services by using supplementary service data, as it is, created in the circuit network 200. In other words, while interworking between one entity (i.e., the supplementary service controller 110) of the packet network 100 and the other entity (i.e., the supplementary service apparatus 240) of the circuit network, the consistency and continuity in view of service quality for the supplementary services provided to the terminals 400 can be maintained under hetero network environment configured with the packet network 100 and the circuit network 200.

Figures 4, 5:
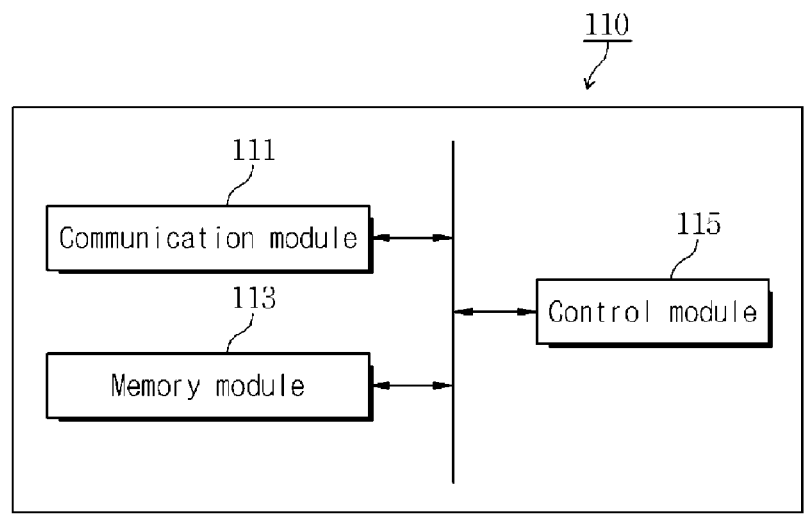
FIG. 4 is a schematic block diagram of the configuration of a supplementary service controller in accordance with at least one embodiment.
FIG. 5 is a diagram of a service profile in accordance with at least one embodiment.

FIG. 4 is a schematic block diagram of the configuration of a supplementary service controller in accordance with at least one embodiment.

Referring to FIG. 4, the supplementary service controller 110 includes a communication module 111, a memory module 113, and a control module 115.

The communication module 111 may be configured to transmit and receive data to and from other entities in the packet network 100 and one or more elements (or entities) in the circuit network 200. For this, the communication module 111 may perform processing data into data in a suitable protocol format by which the data processed with a suitable protocol format is sent to or received from one or more targeting entities. Basically, the supplementary service controller 110 can communicate with other entities in the packet network 100 in a SIP protocol. Therefore, the communication module 111 may process data into a format of SIP protocol when communicating with other entities in the packet network 100. Also, for data security, the supplementary service controller 110 can communicate with the home subscriber apparatus 130 and the charging processor 180 in a format of DIAMETER protocol. Therefore, the communication module 111 may process relevant data into one in a format of DIAMETER protocol when communicating with the home subscriber apparatus 130 and the charging processor 180 in the packet network 100. The supplementary service controller 110 can communicate with the HLR 210 and the IGW 220 in a MAP (Mobile Application Part) protocol. Therefore, the communication module 111 may process data in a MAP protocol when communicating with the HLR 210 and the IGW 220. Further, the supplementary service controller 110 can communicate with the ring back tone service apparatus 243 by using a according to TCP/IP (Transmission Control Protocol/Internet Protocol). Therefore, the communication module 111 may process data in a format of TCP/IP when communicating with the ring back tone service apparatus 243.

The memory module 113 may be configured to store a service profile received from the HLR 210 in the circuit network 200 and a service profile received from the home subscriber apparatus 130 in the packet network 100. If the supplementary service controller 110 provides supplementary services in the packet network 100 only, the memory module 113 may store supplementary service data required for providing supplementary services.

The control module 115 may be configured to control a chain of processing steps required for providing supplementary services in the supplementary service controller 110.

The control module 115 may be configured to search a service profile and check for supplementary services available for the terminals 400. A service profile has a list of services, and each item in the list indicates a basic service or a supplementary service. The control module 115 provides a supplementary service when a relevant item corresponding to the supplementary service in the list is activated in the service profile. If a relevant item is inactivated in the service profile, the control module 115 does not provide the corresponding supplementary service. Therefore, through a service profile, the control module 115 determines whether to provide a supplementary service to a caller terminal or recipient terminal.

The control module 115 may create a synchronization message for synchronizing state information of a service profile stored in the memory module 113 and of a service profile stored in the HLR 210, and then send the synchronization message to the HLR 210 through the communication module 111. Also, when the synchronization message is received from the HLR 210, the control module 115 may change state information of an item indicated by supplementary service identification information of a synchronization message in a service profile stored in the memory module 113. And also, the control module 115 may receive, from the terminals 400 through the communication module 111, a state change request message that requests a change in state information of a service profile. Therefore, the control module 115 may change or updated state information of an item indicated by supplementary service identification information of a state change request message in a service profile stored in the memory module 113. At this time, state information may be activated or deactivated depending on setting information of a state change request message.

The control module 115 may check for supplementary services providable to the terminals 400 by querying and searching a service profile of the HLR 210 in the circuit network 200. Also, the control module 115 may check for supplementary services providable to the terminals 400 by referring to a service profile, which having already been received from the HLR 210, stored in the memory module 113.

After checking the service profile, the control module 115 may provide a relevant supplementary service to a caller terminal 401 or a recipient terminal 402. The control module 115 may provide the supplementary service by interworking with the supplementary service apparatus 240 of the circuit network 200, or provide the supplementary service by itself (i.e., alone) without any further interworking with the supplementary service apparatus 240.

In some embodiments of providing supplementary service(s) by interworking with the supplementary service apparatus 240, the control module 115 may provide supplementary service(s) after interworking with the supplementary service apparatus 240 by using the communication module 111. By receiving supplementary service data required for providing supplementary service(s) from the supplementary service apparatus 240, the control module 115 may provide supplementary service(s) to the terminals 400. For example, the control module 115 may receive a multimedia ring back tone from the ring back tone service apparatus 243 through the communication module 111 and provide it to the terminals 400. Also, the control module 115 may provide supplementary service(s) to the terminals 400 by querying and searching supplementary service data stored in the supplementary service apparatus 240. For example, the supplementary service controller 110 may search an incoming call blocking list in the recipient service apparatus 241. Namely, when the caller terminal 401 sends a request for call connection to the recipient terminal 402, the control module 115 may query the recipient service apparatus 241 about whether the caller terminal 401 is registered in an incoming call blocking list of the recipient terminal 402. Then, the recipient service apparatus 241 may respond about whether registered or not. If the caller terminal 401 is registered in an incoming call blocking list of the recipient terminal 402, the control module 115 may not accept a call connection of the call terminal 401. The control module 115 may request the supplementary service apparatus 240 to provide supplementary service(s) to the terminals 400 by sending supplementary service data required for providing supplementary service(s). For example, the control module 115 may transmit, using the communication module 111, a voice message to the voice message service apparatus 244 through the session controller 120 and the media gateway controller 140 and thereby request the voice message service apparatus 244 to send the voice message to the recipient terminal 402.

FIG. 5 is a diagram of a service profile in accordance with at least one embodiment.

Referring to FIG. 5, a service profile arranges items (services) associated with each subscriber terminal (or each subscriber). Each service may be a basic service or a supplementary service, but the service profile in FIG. 5 illustrates supplementary service(s) only.

As shown in FIG. 5, a service profile records one or more items that respectively indicate various types of supplementary services. Each item has state information, which may be a kind of flag value for indicating an active or inactive state. Therefore, any item with activated state information indicates a state in which the corresponding supplementary service can be provided to a subscriber's terminal. Any item with inactivated state information indicates a state in which the corresponding supplementary service cannot be provided. For example, referring to a line reopening notification service in FIG. 5, users 1 and 2 with activated state can be provided with this supplementary service (i.e., a line reopening notification service). However, user 3 with deactivated state cannot be provided with this supplementary service.

In at least one embodiment, the supplementary service controller 110 may query a service profile for a specific subscriber's terminal (or a specific subscriber) to the HLR 210 or the home subscriber apparatus 130 and thereby check for a supplementary service providable to the specific subscriber' terminal (or the specific subscriber).

In at least another embodiment, the supplementary service controller 110 may receive a service profile from the HLR 210 or the home subscriber apparatus 130 and store it. Then the supplementary service controller 110 may check for a supplementary service providable to the subscriber' terminal (or the subscriber) from the stored service profile. As such, if the supplementary service controller 110 and the HLR 210 or the home subscriber apparatus 130 share a service profile, and if this shared service profile is changed in one of the supplementary service controller 110 and the HLR 210, or in one of the supplementary service controller 110 and the home subscriber apparatus 130, the changed service profile can be synchronized with the corresponding service profile stored in the other by changing or updating the corresponding service profile such that both of entities (i.e., both the supplementary service controller 110 and the HLR 210, or both of the supplementary service controller 110 and the home subscriber apparatus 130) maintain the same service profile.

The supplementary service controller 110 may provide a supplementary service only when an item indicating the supplementary service through a service profile is activated. Therefore, by sharing a service profile with the HLR 210, the supplementary service controller 110 may provide the same supplementary service to the terminals 400 in the packet network 100 as in the circuit network 200. Also, the supplementary service controller 110 may provide supplementary service(s) through the supplementary service apparatus 240, which is to provide supplementary service(s) in the circuit network 200. Therefore, the supplementary service controller 110 may provide supplementary service(s) in the packet network 100 by means of data and method of the same form as in the circuit network 200.

Figure 6:
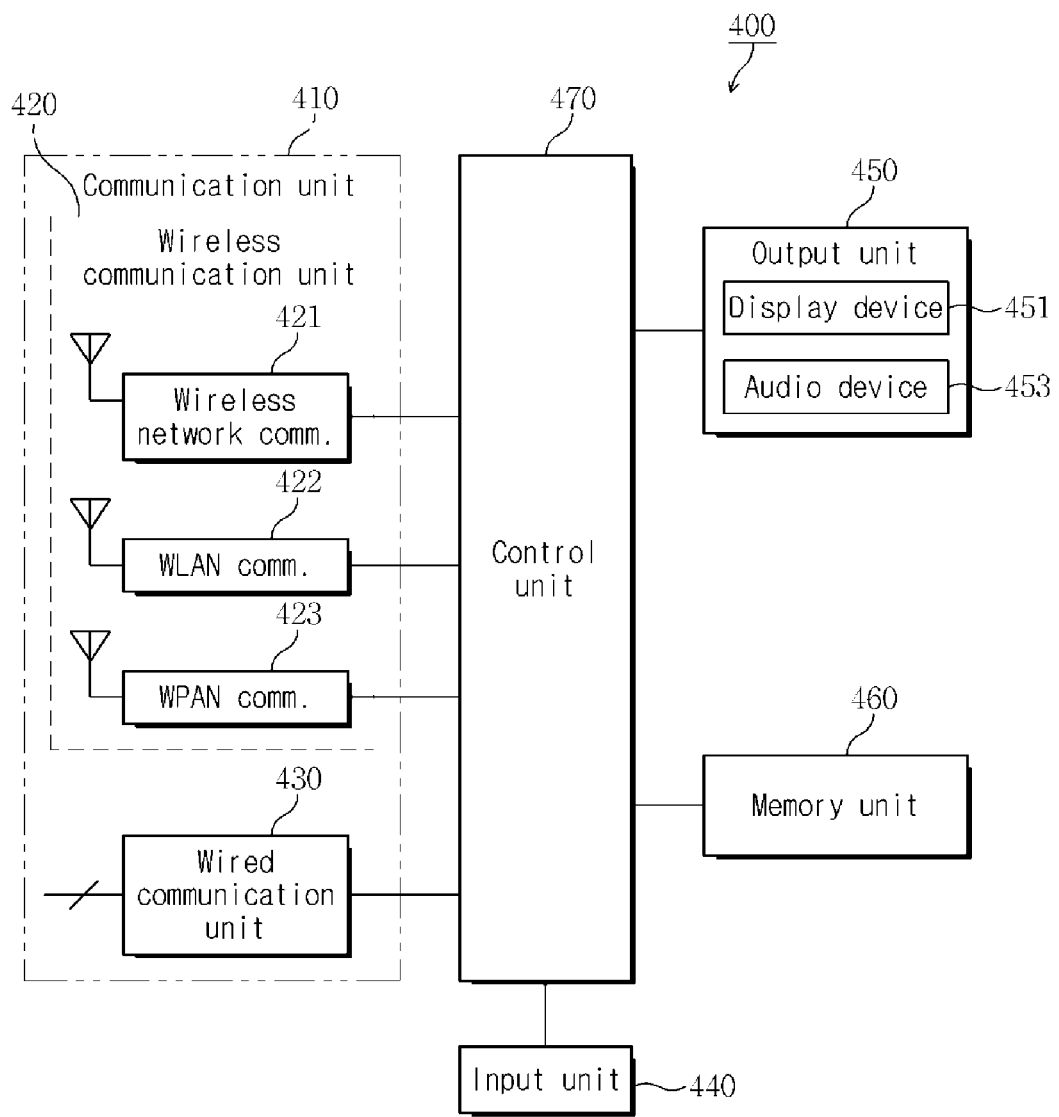
FIG. 6 is a schematic block diagram of a terminal configured to use supplementary services in accordance with at least one embodiment.

FIG. 6 is a schematic block diagram of a terminal configured to use supplementary services in accordance with at least one embodiment.

Referring to FIG. 6, the terminal 400 in at least one embodiment includes a communication unit 410, an input unit 440, an output unit 450, a memory unit 460, and a control unit 470. In some embodiments, one or more entities of one or more of the packet network 100 and circuit network 200 (e.g., the session controller 120, the MGCF 140, the HLR 210, the IGW 220, and/or the supplementary service apparatus(s) 240) is/are configured similarly to the supplementary service controller 110 and/or the terminal 400.

The communication unit 410 is configured to transmit or receive data after accessing the packet network 100 or the circuit network 200 through the access network 300. Here, data includes various messages in a format of SIP protocol, a state change request message, a state change response message, or the like.

The communication unit 410 may include at least one of a wireless communication unit 420 and a wired communication unit 430. The wireless communication unit 420 may include at least one of a wireless network communication unit 421, a WLAN (Wireless Local Area Network, or WiFi (Wireless Fidelity) or WiMAX (Worldwide Interoperability for Microwave Access)) communication unit 422, a WPAN (Wireless Personal Area Network) communication unit 423, and the like.

The wireless communication unit 420 is configured to transmit and receive data by a wireless communication via air interface. If the terminals 400 use a wireless communication, the wireless communication unit 420 may transmit or receive data using one of the wireless network communication unit 421, the WLAN communication unit 422, and the WPAN communication unit 423.

The wireless network communication unit 421 is configured to transmit and receive data by accessing the packet network 100 or the circuit network 200 after accessing the access network 300 through the base station 310. The wireless network communication unit 421 may receive data from the control unit 470, access the access network 300 through the base station 310, access either the packet network 100 or the circuit network 200, and then transmit data. Also, the wireless network communication unit 421 may access the access network 300 through the base station 310, access either the packet network 100 or the circuit network 200, receive data from either the packet network 100 or the circuit network 200, and then provide the received data to the control unit 470.

The WLAN communication unit 422 is configured to perform a communication via air interface such as WLAN, WiFi or WiMAX. When receiving data from the control unit 470, the WLAN communication unit 422 may access the access network 300 through access point, access either the packet network 100 or the circuit network 200, and then transmit data to either the packet network 100 or the circuit network 200. Also, the WLAN communication unit 422 may access the access network 300 through access point, access either the packet network 100 or the circuit network 200, receives data from either the packet network 100 or the circuit network 200, and then provide the received data to the control unit 470.

The WPAN communication unit 423 is configured to transmit or receive data in a format of WPAN protocol which is much adapted to a shorter-range wireless communication rather than the wireless network communication unit 421 and the WLAN communication unit 422. In case of being connectable to a gateway directly or through multi-hop, the WPAN communication unit 423 may access either the packet network 100 or the circuit network 200 through a gateway, and then transmit or receive data. For example, the WPAN communication unit 423 may be Bluetooth, IrDA, ZigBee, or the like.

The wired communication unit 430 is configured to transmit and receive data in a wired manner. The wired communication unit 430 may access either the packet network 100 or the circuit network 200 through wires, and then transmit or receive data to or from either the packet network 100 or the circuit network 200.

The input unit 440 is configured to receive one of user command, selection, data, and information, and may have a plurality of input keys and function keys for receiving numeral or text inputs and setting various functions. Additionally, the input unit 440 is configured to detect user's key input and deliver an input signal based on the detected key input to the control unit 470. For example, the input unit 440 may use a typical input device such as a keyboard, a keypad, a mouse, and a joystick, or all kinds of any other input device.

The output unit 450 is configured to output information or results caused by the operation of the terminal 400, and to output supplementary service data. The output unit 450 may have a display device 451 that outputs visual information, and an audio device 453 that outputs audible information. In at least one embodiment, the output unit 450 may visually display supplementary service data on the screen. For example, this supplementary service data may be a phone number of a missed call when a call is not answered in the terminals 400. The display device 451 may be a touch screen. If the display device 451 is formed of a touch screen, the display device 451 may perform parts or all of functions of the input unit 440. The audio device 453 may audibly output supplementary service data. For example, this supplementary service data may be a voice message.

Particularly, when a state change response message is received, the output unit 450 outputs it through the display device 451 and the audio device 453 such that a user can perceive visually and audibly a change of state information. For example, the output unit 450 may output sound to inform the arrival of a state change response message through the audio device 453 and also display supplementary service(s) with changed state information through the display device 451.

The memory unit 460 is configured to store data and includes a main memory unit and an auxiliary memory unit. The memory unit 460 may store an operation system (OS), applications, and the like. Particularly, when supplementary service data is received, the memory unit 460 may store the received supplementary service data. For example, this supplementary service data may be a phone number of a missed call when a call is not answered in the terminals 400. Various data stored in the memory unit 460 may be deleted, modified, or added, depending on user's manipulations.

The control unit 470 may be a processor that actually is configured to drive the operating system. For example, the control unit 470 may be a CPU (Central Processing Unit). Once power of the terminal 400 is turned on, the control unit 470 is configured to shift the operating system from an auxiliary memory unit of the memory unit 460 to a main memory unit and then perform a booting process for driving the operating system.

When there is a user request through the input unit 440, the control unit 470 is configured to create a state change request message for activating or inactivating specific supplementary service(s) and then send it to the supplementary service controller 110 through the communication unit 410. At this time, the control unit 470 may send a state change request message to the supplementary service controller 110 through the session controller 120 by using a SIP protocol. Additionally, the terminals 400 may directly transmit a state change request message to the supplementary service controller 110 by using an XCAP (Extensible Markup Language Configuration Access Protocol). In some embodiment of using XCAP, the control unit 470 transmits a state change request message through a direct interface Ut with the supplementary service controller 110. A state change request message contains supplementary service identification information for distinguishing each supplementary service from the others, and setting information for indicating whether to activate or inactivate each supplementary service. Also, the control unit 470 may receive a state change response message from the supplementary service controller 110 and thereby check whether state information has been changed or not. The supplementary service controller 110 updates its own supplementary service data by processing and storing at the memory unit 460 the changed state information of the supplementary services requested by the state change request message.

Meanwhile, the control unit 470 may create a state change request message for activating or inactivating the state information of supplementary service(s) and then send it to the HLR 210 through the communication unit 410. Also, the control unit 470 may receive a state change response message from the HLR 210 in response to the sent state change request message and thereby check whether state information of supplementary service(s) requested by the state change request message has been changed or not.

In one embodiment of using a SIP protocol, a state change request message may be the INVITE message, and a state change response message may be the 200 OK message. In one embodiment of using a XCAP protocol, a state change request message may be the HTTP request message, and a state change response message may be the HTTP response message. Meanwhile, in view of a terminal, the state change request may be used for synchronizing between a supplementary service controller of a packet network and a home location register of a circuit network by exchanging the changed the state information of the supplementary services therebetween.

A method for providing supplementary service(s) in accordance with at least one embodiment will be now described.

Figure 7:
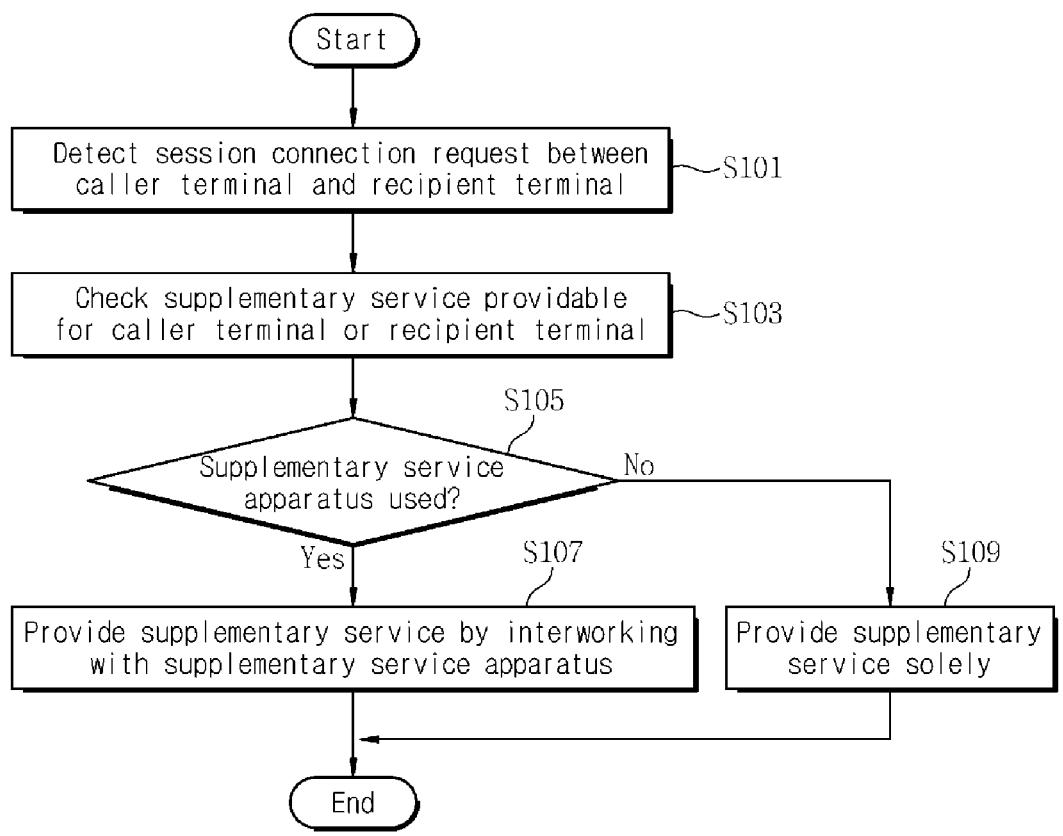
FIG. 7 is a flow diagram of a method for providing supplementary services in accordance with at least one embodiment.

FIG. 7 is a flow diagram of a method for providing supplementary services in accordance with at least one embodiment.

In step S101, the supplementary service controller 110 detects a session connection request between the caller terminal 401 and the recipient terminal 402.

The caller terminal 401 may send the INVITE message for requesting a session connection associated with a basic service (e.g., a call connection) to the recipient terminal 402 by using a SIP protocol, and the session controller 120 may connect (or establish) a session between the caller terminal 401 and the recipient terminal 402 by delivering this INVITE message, which is a message based on SIP, to the recipient terminal 402. As such, the session controller 120 administers (or initiates) a session connection between the caller terminal 401 and the recipient terminal 402. While connecting (or establishing) a session therebetween, the session controller 120 may send the SIP based INVITE message to the supplementary service controller 110 such that the supplementary service controller 110 can know through the INVITE message that a session connection between the terminals 400 is ongoing.

During a session connection (or a session establishment), the supplementary service controller 110 checks, in step S103, for supplementary service(s) providable to the caller terminal 401 that initially sends the INVITE message for a session connection, or to the recipient terminal 402 that lastly receives the INVITE message. In at least one embodiment, the supplementary service controller 110 may receive a service profile from the HLR 210, store the received service profile, search the stored service profile, and thereby check whether or not there are supplementary service(s) providable to the caller terminal 401 or the recipient terminal 402. Alternatively, in at least another embodiment, the supplementary service controller 110 may query the HLR 210 about supplementary service(s) providable to the caller terminal 401 or the recipient terminal 402. In this case, in response to a query from the supplementary service controller 110, the HLR 210 may search a service profile stored therein and send a response to the query the supplementary service controller 110. Based on the response from the HLR 210, the supplementary service controller 110 may check whether or not there are supplementary service(s) providable to the caller terminal 401 or the recipient terminal 402.

In step S105, the supplementary service controller 110 determines whether supplementary service(s) providable to the terminals 400 is (or are) allowed to be provided by interworking with at least one supplementary service apparatus 240.

As the result of determination in step S105, if so, the supplementary service controller 110 provides in step S107 the corresponding supplementary service(s) to the terminals 400 by interworking with at least one supplementary service apparatus 240. In other words, the supplementary service controller 110 utilizes existing resources related to supplementary services from the circuit network by interworking with at least one of supplementary service apparatuses constructed in the circuit network.

The supplementary service controller 110 may receive supplementary service data required for providing supplementary service(s) from at least one supplementary service apparatus 240 and then provide to the terminals 400 the corresponding supplementary service(s) based on the received supplementary service data. For example, the supplementary service controller 110 may receive a multimedia ring back tone as supplementary service data from the ring back tone service apparatus 243 and then provide the multimedia ring back tone as a supplementary service to the terminals 400.

Additionally, the supplementary service controller 110 may provide supplementary service(s) to the terminals 400 by querying and searching supplementary service data stored in at least one supplementary service apparatus 240. For example, the recipient service apparatus 241 stores an incoming call blocking list of one or more the caller terminals denied by the recipient terminal 402, and the supplementary service controller 110 may query the recipient service apparatus 241 about whether the one or more caller terminals are registered in the incoming call blocking list. Based on a response from the recipient service apparatus 241, the supplementary service controller 110 may check whether the one or more caller terminals are registered in the incoming call blocking list. Namely, through a query to and a response from the recipient service apparatus 241, the supplementary service controller 110 may search the incoming call blocking list which is supplementary service data. When an incoming call is originated from the one or more caller terminals, the supplementary service controller 110 may restrict a call connection with the one or more caller terminals by blocking the incoming call.

By sending supplementary service data required for providing supplementary service(s) to at least one of the supplementary service apparatuses, the supplementary service controller 110 may request the terminals 400 to provide supplementary service(s). For example, the supplementary service controller 110 may transmit a voice message as supplementary service data to the voice message service apparatus 244 and then request the voice message service apparatus 244 to send the voice message to the recipient terminal 402.

As the result of determination in step S105, if supplementary service(s) is/are not allowed to be provided by interworking with at least one of the supplementary service apparatuses, the supplementary service controller 110 provides in step S109 supplementary service(s) to the terminals 400.

According to various embodiments as discussed above, the supplementary service controller 110 provides supplementary service(s) in the IMS network which is the packet network 100, and the supplementary service controller 110 utilizes at least one of the supplementary service apparatuses that provides supplementary service(s) in the circuit network 200. These supplementary service apparatuses have database for providing supplementary service(s). Utilization of such existing resources held in the supplementary service apparatuses may allow the packet network 100 to continuously provide supplementary service(s) provided in the circuit network 200. It is therefore possible to consistently provide supplementary services to all following types of the terminals 400: for example, the terminals 400 using a voice service based on packet-switched type such as mVoIP in the packet network 100; the terminals 400 using a voice call service based on circuit-switched type in the circuit network 200; and the terminals 400 capable of using both voice call services based on the packet-switched and circuit-switched types.

Various methods for synchronizing supplementary services in accordance with various embodiments will be now described. According to a first embodiment, the terminals 400 may access the packet network 100 and then activate or inactivate the state information of associated supplementary service(s). Alternatively, according to a second embodiment, the terminals 400 may access the circuit network 200 and then activate or inactivate the state information of associated supplementary service(s).

Figure 8:
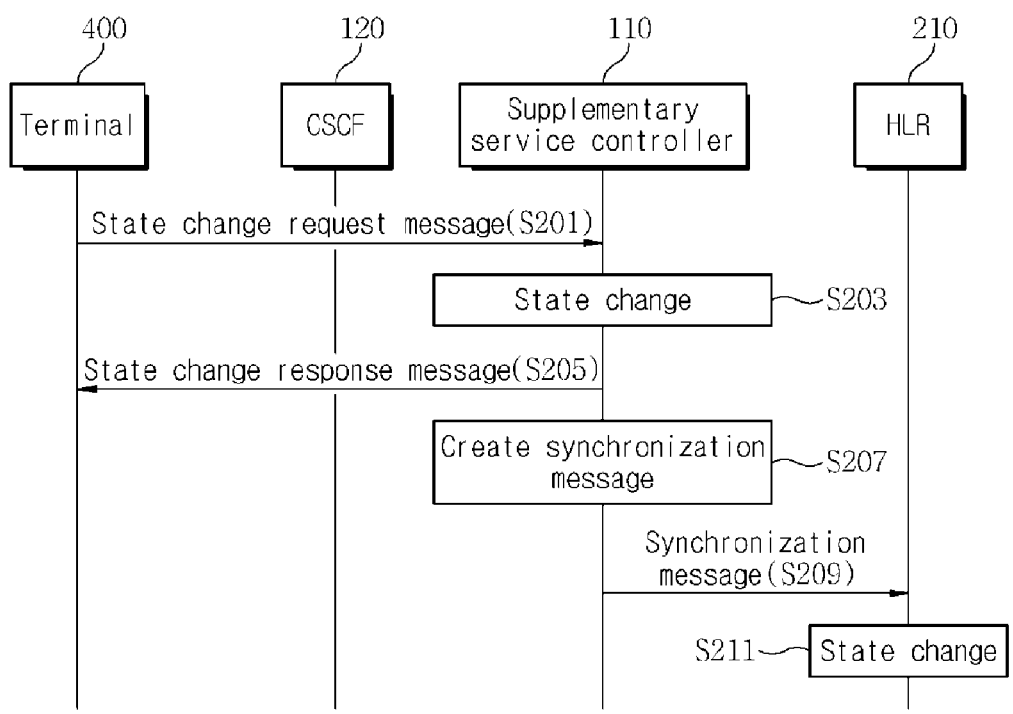
FIG. 8 is a sequence diagram of a method for synchronizing supplementary services in accordance with at least one embodiment.

FIG. 8 is a sequence diagram of a method for synchronizing supplementary services in accordance with at least one embodiment.

Referring to FIG. 8, in step S201, the terminal 400 sends a state change request message to the supplementary service controller 110 in order to activate or inactivate the state information of specific supplementary service(s). A state change request message may be INVITE message based on a SIP protocol, and the terminal 400 may send the SIP based INVITE message to the supplementary service controller 110 through the session controller (CSCF) 120. In at least another embodiment of using XCAP, a state change request message may be HTTP request message, and the terminal 400 may send the HTTP request message to the supplementary service controller 110 through a direct interface Ut. This state change request message contains supplementary service identification information for distinguishing one supplementary service from the others, and setting information for indicating whether to activate or inactivate the state information of the supplementary service.

Therefore, in step S203, based on the state change request message, the supplementary service controller 110 changes the state information of supplementary service(s) in a service profile. Namely, the supplementary service controller 110 may change the state information of specific supplementary service(s) corresponding to supplementary service identification information included in the state change request message according to setting information included in the state change request message. As such, after changing setting of the state information of specific supplementary service(s), the supplementary service controller 110 sends a state change response message to the terminal 400 in step S205.

Meanwhile, the supplementary service controller 110 creates a synchronization message in step S207 and sends the synchronization message to the HLR 210 in step S209. This synchronization message is for synchronizing a service profile between the packet network 100 and the circuit network 200. The synchronization message contains supplementary service identification information for distinguishing a specific supplementary service(s), the state information of which will be changed, from the other supplementary services. In step S211, the HLR 210 receiving the synchronization message changes setting of supplementary service(s) in a service profile, based on the received synchronization message in such a manner where the HLR 210 toggles the state information of specific supplementary service(s) corresponding to supplementary service identification information included in the synchronization message. For example, if the state information of a supplementary service in a service profile is initially set as "inactive" and a synchronization message is received, the HLR 210 changes setting of the state information by toggling from an inactive state to an active state based on supplementary service identification information of the received synchronization message. At this time, the supplementary service controller 110 and the HLR 210 interwork with each other, and thus the synchronization message may use AnyTimeModification message based on MAP as discussed above in <Example 1> and <Example 2>.

Figure 9:
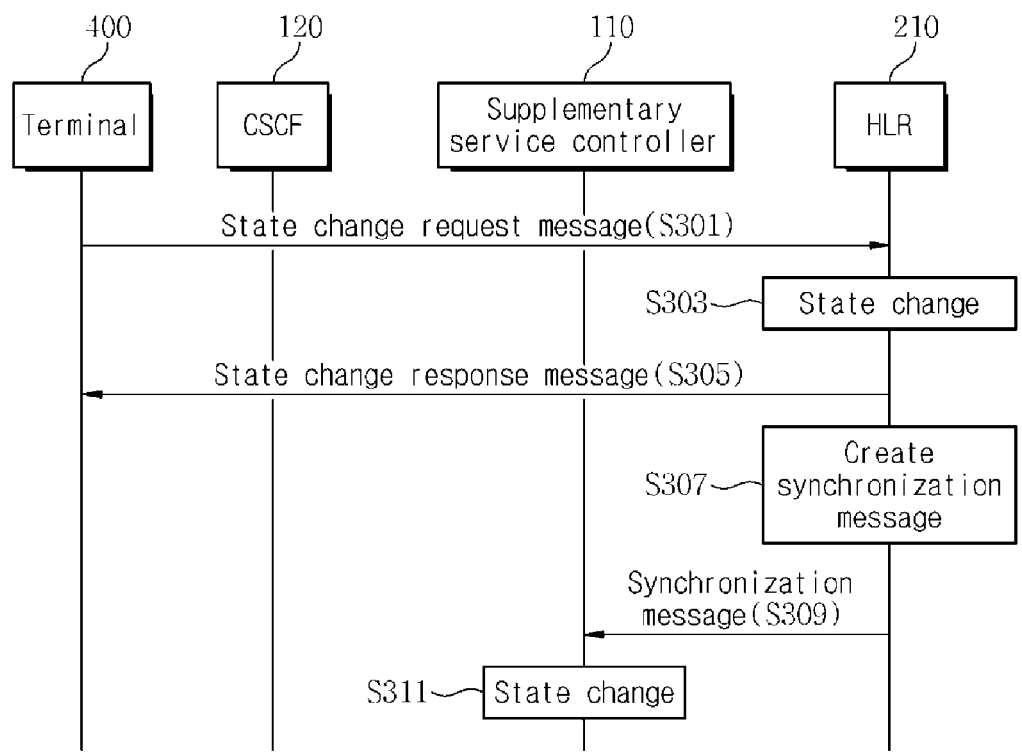
FIG. 9 is a sequence diagram of a method for synchronizing supplementary services in accordance with at least another embodiment.

FIG. 9 is a sequence diagram of a method for synchronizing supplementary services in accordance with at least another embodiment.

Referring to FIG. 9, in step S301, the terminal 400 sends a state change request message to the HLR 210 in order to activate or inactivate specific supplementary service(s). This state change request message contains supplementary service identification information for distinguishing one supplementary service from the others, and setting information for indicating whether to activate or inactivate the state information of the supplementary service(s).

Therefore, in step S303, based on the state change request message, the HLR 210 changes the state information of supplementary service(s) in a service profile. Namely, the HLR 210 may change the state information of specific supplementary service(s) corresponding to supplementary service identification information included in the state change request message depending on setting information included in the state change request message. As such, after changing the state information of supplementary service(s), the HLR 210 sends a state change response message to the terminal 400 in step S305.

Meanwhile, the HLR 210 creates a synchronization message in step S307 and sends the synchronization message to the supplementary service controller 110 in step S309. This synchronization message is configured to synchronize a service profile between the packet network 100 and the circuit network 200. Therefore, the synchronization message contains supplementary service identification information for distinguishing a specific supplementary service, the state information of which will be changed, from the others. In step S311, the supplementary service controller 110 receiving the synchronization message changes the state information of supplementary service(s) in a service profile, based on the received synchronization message in such a manner that the supplementary service controller 110 toggles from an inactive state to an active state, and vice versa, the state information of a specific supplementary service corresponding to supplementary service identification information included in the synchronization message. Since the supplementary service controller 110 and the HLR 210 interwork with each other through IGW 220, the synchronization message may use AnyTimeModification message based on MAP as discussed above in <Example 1> and <Example 2>.

Figure 10:
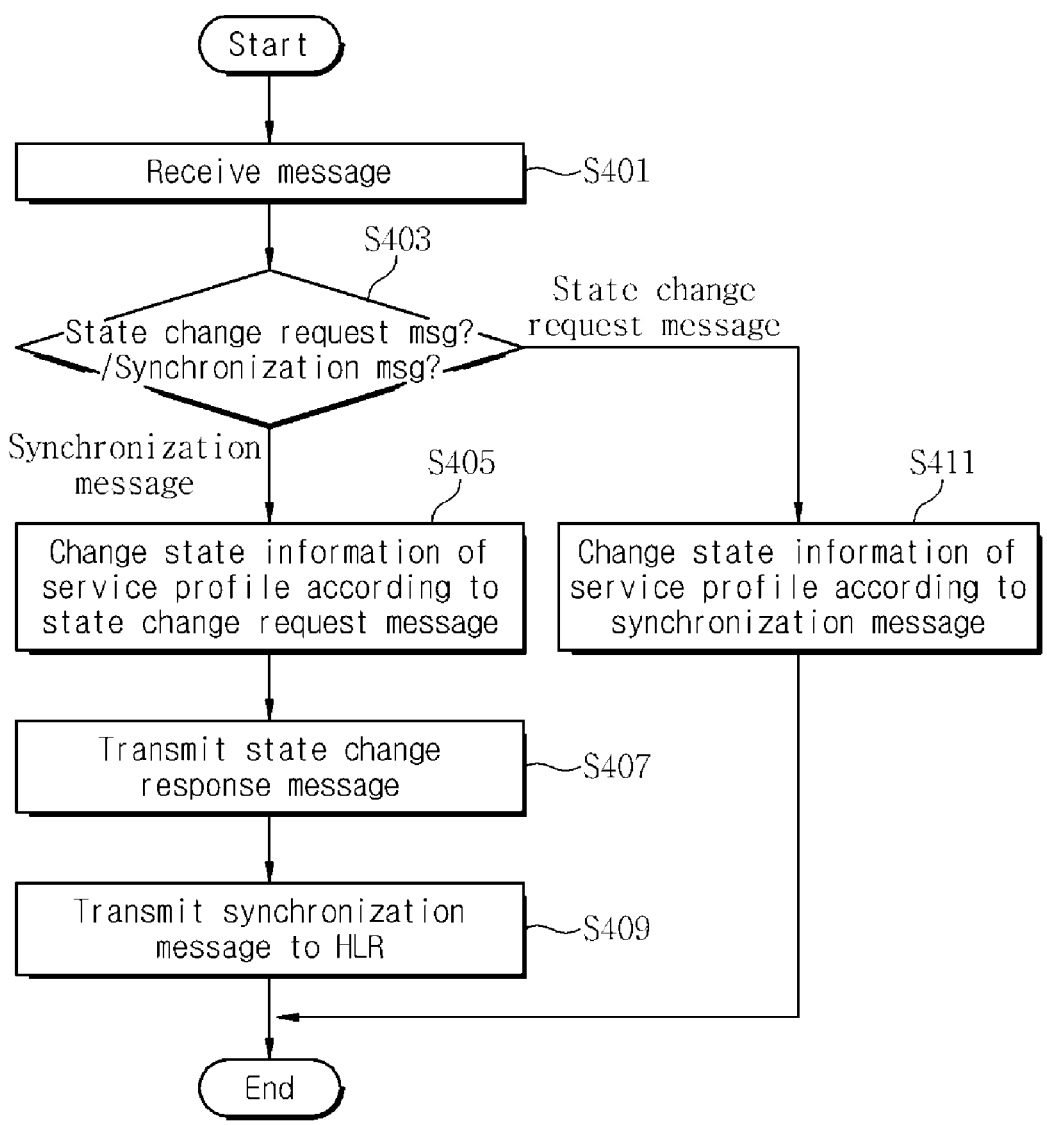
FIG. 10 is a flow diagram of a method for providing synchronized supplementary services at a supplementary service controller in accordance with at least one embodiment.

FIG. 10 is a flow diagram of a method for providing synchronized supplementary services at a supplementary service controller in accordance with at least one embodiment.

Referring to FIG. 10, once receiving a message in step S401 the supplementary service controller 110 determines in step S403 whether the received message is a state change request message or a synchronization message. Then step S405 is performed if the received message is determined to be a state change request message, whereas step 411 is performed if the received message is determined to be a synchronization message.

If the received message is a state change request message, the supplementary service controller 110 may change in step S405 the state information of specific item(s) (i.e., supplementary service(s)) indicated by supplementary service identification information included in the state change request message in such a manner that the supplementary service controller 110 changes setting of the state information of supplementary service(s), which are held in its own service profile, by toggling from an active state to an inactive state, and vice versa, depending on setting information included in the state change request message. In step S407, the supplementary service controller 110 sends a state change response message to the terminal 400 in response to the state change request message. Next, in step S409, the supplementary service controller 110 creates a synchronization message based on the state change request message and then sends the created synchronization message to the HLR 210. Here, the synchronization message contains supplementary service identification information for distinguishing a specific supplementary service, the state information of which will be changed, from the others.

Meanwhile, if the received message is a synchronization message, the supplementary service controller 110 may change in step S411 the state information of specific item(s) (i.e., supplementary service(s)), which are held in its own service profile, indicated by supplementary service identification information included in the received synchronization message.

According to various embodiments as discussed above, the supplementary service controller 110 is configured in order to provide supplementary services in the IMS network which is the packet network 100. This supplementary service controller 110 is configured to share a service profile with the HLR 210 of the circuit network 200 and synchronize the shared service profile between the packet network 100 and the circuit network 200. Therefore, it is possible to consistently provide supplementary services to all following types of the terminals: for example, the terminals using a voice service based on packet-switched type such as mVoIP in the packet network 100; the terminals using a voice call service based on circuit-switched type in the circuit network 200; and the terminals capable of using both voice call services based on the packet-switched and circuit-switched types.

In various embodiments as discussed above, since supplementary services for a packet based voice call may be provided in the packet network by using infrastructures of the circuit network, it is possible to utilize database and web resources constructed for providing supplementary services in the circuit network. Additionally, this may reduce an infrastructure cost required for providing supplementary services. Also, since the circuit network and the packet network share and use the same database, connectivity and continuity of supplementary services may be maintained both in the circuit network and in the packet network. Additionally, by sharing and synchronizing a service profile indicating a list of supplementary services joined by users' terminals in both the circuit network and the packet network, supplementary services may be equally provided with all types of terminals in the circuit network and in the packet network.

The method for providing supplementary services through an interworking structure of circuit network and packet network and the method for synchronizing supplementary services in various embodiments may be implemented in the form of program being readable through a variety of computer means and be recorded in any non-transitory, computer-readable medium. Here, this medium may contain, alone or in combination, program instructions, data files, data structures, and the like. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions may include machine language codes made by a complier and high-level language codes executable in a computer using an interpreter or the like. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

While various embodiments have been particularly shown and described, it will be understood by those skilled in the art that various changes in form and details may be made therein without departing from the subject matter and scope of this disclosure. Specific terms used in this disclosure and drawings are used for illustrative purposes and not to be considered as limitations of the present disclosure.

What is claimed is:

1. A packet network system for providing supplementary services, said packet network system comprising:
   a session controller configured to establish a session connection associated with a basic service between terminals that access the packet network; and
   a supplementary service controller configured to
   receive a service profile having information about the supplementary services from a circuit network, wherein the service profile of the circuit network is transmitted in one way direction from the circuit network to the packet network in order to allow the packet network system to use the service profile currently used in the circuit network when the packet network system does not have an independent service profile to provide the supplementary services with the terminals to access the packet network, store the received service profile, check for a supplementary service providable to at least one of the terminals to access the packet network based on the stored service profile of the circuit network, when there is a request for a session connection between the terminals that access the packet network, wherein the service profile having, for the at least one of the terminals,
  (i) a list of supplementary services associated with the terminal, and
  (ii) state information associated with each supplementary service and indicating whether to provide the corresponding supplementary service or not;

receive supplementary service data of the providable supplementary service from a supplementary service apparatus located in the circuit network, and provide the providable supplementary service to the at least one of the terminals by using the received supplementary service data, wherein the supplementary service controller is further configured to transmit data required for providing supplementary service to the supplementary service apparatus, and to request the supplementary service apparatus to provide the supplementary service to the at least one of the terminals by using the transmitted data, and wherein the session controller and the supplementary controller are located in the packet network, and when the packet network system does not have the independent service profile to provide the supplementary services with the terminals to access the packet network, the supplementary service controller is configured to request the service profile used in the circuit network by communicating with the supplementary service apparatus located in the circuit network in order to share the service profile of the circuit network with the packet network.

2. A supplementary service controller for providing supplementary services, said supplementary service controller comprising:

a communication module configured to transmit and receive data;

a memory module; and a control module configured to receive a service profile having information about supplementary services from a circuit network through the communication module, store the received service profile in the memory module, wherein the service profile of the circuit network is transmitted in one way direction from the circuit network to the packet network in order to allow the packet network system to use the service profile currently used in the circuit network when the packet network system does not have an independent service profile to provide the supplementary services with the terminals to access the packet network, check for a supplementary service providable to at least one of terminals to access the packet network based on the stored service profile of the circuit network, when there is a session connection associated with a basic service between the terminals that access a packet network, wherein the service profile having, for the at least one of the terminals,
  (i) a list of supplementary services associated with the terminal, and
  (ii) state information associated with each supplementary service and indicating whether to provide the corresponding supplementary service or not;

receive supplementary service data of the providable supplementary service from a supplementary service apparatus located in the circuit network through the communication module, and provide the providable supplementary service to the at least one of the terminals through the communication module by using the received supplementary service data, wherein the control module is further configured to transmit data required for providing supplementary service to the supplementary service apparatus through the communication module, and to request the supplementary service apparatus to provide the supplementary service to the at least one of the terminals by using the transmitted data, and wherein the supplementary service controller is located in the packet network, and when the packet network system does not have the independent service profile to provide the supplementary services with the terminals to access the packet network, the control module is configured to request the service profile the circuit network used in the circuit network by communicating with the supplementary service apparatus located in the circuit network in order to share the service profile of the circuit network with the packet network.

3. The supplementary service controller of claim 2, wherein the control module is further configured to search the received supplementary service data, and then to provide the supplementary service to the at least one of the terminals according to the searched supplementary service data.

4. The supplementary service controller of claim 2, wherein the control module is further configured, when receiving a state change request message for requesting a change of the state information from one of the terminals through the communication module, to change the state information in the memory module according to the received state change request message, and transmit to the home location register through the communication module a synchronization message that requests the home location register to change the state information of the supplementary services in the home location register to be the same as the changed state information.

5. The supplementary service controller of claim 4, wherein the control module is further configured, when receiving from the home location register a synchronization message that requests the control module to change the state information of a supplementary service to be the same as the state information of the supplementary services in the home location register, to change the state information of the supplementary services in the memory module according to the received synchronization message.

6. The supplementary service controller of claim 4, wherein the control module is further configured to change the state information of the supplementary services in the memory module according to the received state change request message, and then to transmit to the terminal through the communication module a state change response message that indicates a change of the state information.

7. A communication system for providing synchronized supplementary services, said communication system comprising:

a plurality of terminals;
a circuit network including a home location register that stores, for each of the plurality of terminals, a service profile having a list of supplementary services associated with the terminals, the circuit network configured to provide at least one of the supplementary services to the terminals that access the circuit network according to state information associated with the supplementary service and indicating either activation or inactivation of the supplementary service; and
a packet network including a supplementary service controller, the supplementary service controller configured to
receive the service profile having information about the supplementary services from a circuit network, wherein the service profile of the circuit network is transmitted in one way direction from the circuit network to the packet network in order to allow the packet network system to use the service profile currently used in the circuit network when the packet network system does not have an independent service profile to provide the supplementary services with the terminals to access the packet network,
store the received service profile,
check for a supplementary service providable to at least one of the terminals to access the packet network based on the stored service profile of the circuit network, when there is a request for a session connection between the terminals that access the packet network, wherein the service profile having, for the at least one of the terminals,
(i) a list of supplementary services associated with the terminal, and
(ii) state information associated with each supplementary service and indicating whether to provide the corresponding supplementary service or not;
receive supplementary service data of the providable supplementary service from a supplementary service apparatus located in the circuit network, and
provide the providable supplementary service to the at least one of the terminals that accesses the packet network by using the received supplementary service data;
wherein the supplementary service controller is further configured to transmit data required for providing supplementary service to the supplementary service apparatus, and to request the supplementary service apparatus to provide the supplementary service to the at least one of the terminals by using the transmitted data,
wherein the terminals are configured to transmit to the packet network a message that requests a change of the state information with respect to at least one of the supplementary services, and
wherein the supplementary service controller is located in the packet network system, and when the packet network system does not have the independent service profile to provide the supplementary services with the terminals to access the packet network, the supplementary service controller is configured to request the service profile used in the circuit network by communicating with the supplementary service apparatus located in the circuit network in order to share the service profile of the circuit network with the packet network.

8. A method of providing supplementary services at a supplementary service controller of a packet network, said method comprising:
receiving, at the supplementary service controller of the packet network, a service profile having information about a supplementary service from a circuit network, wherein the service profile of the circuit network is transmitted in one way direction from the circuit network to the packet network in order to allow the packet network to use the service profile currently used in the circuit network when the packet network system does not have an independent service profile to provide the supplementary services with the terminals to access the packet network;
storing, at the supplementary service controller, the received service profile;
checking, at the supplementary service controller, for the supplementary service providable to the at least one of terminals to access the packet network based on the stored service profile of the circuit network, when there is a request for a session connection between the terminals that access the packet network, wherein the service profile having, for the at least one of the terminals,
(i) a list of supplementary services associated with the terminal, and
(ii) state information associated with each supplementary service and indicating whether to provide the corresponding supplementary service or not;
receiving, at the supplementary service controller, supplementary service data of the providable supplementary service from a supplementary service apparatus located in the circuit network; and
providing, at the supplementary service controller, the providable supplementary service to the at least one of the terminals accessing the packet network by using the received supplementary service data,
wherein the supplementary service controller is further configured to transmit data required for providing supplementary service to the supplementary service apparatus, and to request the supplementary service apparatus to provide the supplementary service to the at least one of the terminals by using the transmitted data, and
wherein the supplementary controller are located in the packet network, and when the packet network system does not have the independent service profile to provide the supplementary services with the terminals to access the packet network, the supplementary service controller is configured to request the service profile used in the circuit network by communicating with the supplementary service apparatus located in the circuit network in order to share the service profile of the circuit network with the packet network.

9. The method of claim 8, wherein the providing of the supplementary service includes:
searching supplementary service data of the supplementary service apparatus; and
providing the supplementary service to the at least one of the terminals according to the searched supplementary service data.

10. A method of providing synchronized supplementary services at a supplementary service controller of a packet network, said method comprising:
receiving, at the supplementary service controller of the packet network, a service profile having information about a supplementary service from a circuit network, wherein the service profile of the circuit network is transmitted in one way direction from the circuit network to the packet network in order to allow the packet network to use the service profile currently used in the circuit network when the packet network system does not have an independent service profile to provide the supplementary services with the terminals to access the packet network;

storing, at the supplementary service controller, the received service profile;

determining whether a received message is (i) a state change request message that requests a change of state information corresponding to a supplementary service of the supplementary service controller, or (ii) a synchronization message that requests a change of the state information to be the same as the state information of a home location register of a circuit network;

changing the state information of the stored service profile according to the state change request message when the received message is determined as the state change request message;

transmitting to the home location register the synchronization message to change the state information of the home location register as the changed state information;

checking, at the supplementary service controller, for a supplementary service providable to at least one of terminals to access the packet network based on the stored service profile of the circuit network, when there is a request for a session connection between the terminals that access the packet network, when there is a request for a session connection between the terminals that access the packet network, wherein the service profile having, for the at least one of the terminals,
  (i) a list of supplementary services associated with the terminal, and
  (ii) state information associated with each supplementary service and indicating whether to provide the corresponding supplementary service or not;

receiving, at the supplementary service controller, supplementary service data of the providable supplementary service from a supplementary service apparatus located in the circuit network; and providing, at the supplementary service controller, the providable supplementary service to the at least one of the terminals accessing the packet network by using the received supplementary service data, wherein the supplementary service controller is further configured to transmit data required for providing supplementary service to the supplementary service apparatus, and to request the supplementary service apparatus to provide the supplementary service to the at least one of the terminals by using the transmitted data, and wherein the supplementary controller is located in the packet network, and when the packet network system does not have the independent service profile to provide the supplementary services with the terminals to access the packet network, the supplementary service controller is configured to request the service profile used in the circuit network by communicating with the supplementary service apparatus located in the circuit network in order to share the service profile of the circuit network with the packet network.

11. The method of claim 10, further comprising:

changing the state information of the supplementary service controller according to the synchronization message to be the same as the state information of the home location register when the received message is determined as the synchronization message.

12. The method of claim 10, further comprising:

transmitting to a terminal that sent the state change request message a state change response message that indicates a change of the state information according to the state change request message.

* * * * *